United States Patent [19]
Goodwin III

[11] Patent Number: 6,026,373
[45] Date of Patent: Feb. 15, 2000

[54] METHOD OF SENDING MESSAGES TO AN ELECTRONIC PRICE LABEL

[75] Inventor: John C. Goodwin III, Suwanee, Ga.

[73] Assignee: NCR Corporation, Dayton, Ohio

[21] Appl. No.: 08/960,667

[22] Filed: Oct. 30, 1997

[51] Int. Cl.[7] .............................. G06F 15/16; G09G 3/20
[52] U.S. Cl. ............................ 705/20; 395/214; 354/192; 705/26; 705/25; 705/1
[58] Field of Search .............................. 705/20; 395/214; 354/192

[56] References Cited

U.S. PATENT DOCUMENTS

| | | | |
|---|---|---|---|
| 4,002,886 | 1/1977 | Sundelin | 235/61.7 R |
| 4,500,880 | 2/1985 | Gomersall et al. | 340/825.35 |
| 4,661,808 | 4/1987 | Rector et al. | 354/192 |
| 4,924,363 | 5/1990 | Kornelson | 362/125 |
| 5,172,314 | 12/1992 | Poland et al. | 364/401 |
| 5,448,226 | 9/1995 | Failing, Jr. et al. | 340/825.35 |
| 5,632,010 | 5/1997 | Briechle et al. | 395/214 |

*Primary Examiner*—James P. Trammell
*Assistant Examiner*—Nga B. Nguyen
*Attorney, Agent, or Firm*—Paul W. Martin; Peter H. Priest

[57] ABSTRACT

A method of sending information to an electronic price label (EPL) for display which requires only one message to be sent to the EPL. Second information is recorded in response to an operator request to change first information displayed by the EPL. The second information includes predetermined characters within a group of characters including numerals 0–9, letters A–Z, blanks, and predetermined symbols. The second information is encoded into a word using a number of translation tables. The word is sent to the EPL in a single wireless message. The word is received by the EPL. The word is decoded by the EPL using the translation tables. Finally, the second information is displayed by the EPL.

14 Claims, 2 Drawing Sheets

METHOD OF SENDING MESSAGES TO AN ELECTRONIC PRICE LABEL

BACKGROUND OF THE INVENTION

The present invention relates to electronic price label (EPL) systems, and more specifically to a method of sending messages to an EPL.

EPL systems typically include a plurality of EPLs for each merchandise item in a store. EPLs include displays which display the price of corresponding merchandise items on store shelves and are typically attached to a rail along the leading edge of the shelves. EPL systems typically obtain their prices from the POS server's PLU file. A store may contain thousands of EPLs to display the prices of the merchandise items. The EPLs are coupled to a central server from where information about the EPLs is typically maintained in an EPL data file. The EPL data file contains EPL identification information, and EPL merchandise item information.

Data to be displayed by an EPL is stored within a memory within the EPL. The data typically includes segments associated with characters to be displayed.

Unfortunately, segment data is difficult and time-consuming to work with. For each character to be displayed by an EPL, an EPL computer must consult a reference table in order to determine the segments that must be used to form the character. The EPL computer must not only transmit the segment data to the EPL, but also instructions telling the EPL how to use the segment data to create characters for display. This process requires the EPL computer to send multiple messages to the EPL, which negatively impacts system bandwidth, system speed, and system reliability.

Therefore, it would be desirable to provide a method of sending messages to an EPL which requires fewer messages.

SUMMARY OF THE INVENTION

In accordance with the teachings of the present invention, a method of sending messages to an EPL is provided.

Second information is recorded in response to an operator request to change first information displayed by the EPL. The second information includes predetermined characters within a group of characters including numerals 0–9, letters A–Z, blanks, and predetermined symbols. The second information is encoded into a word using a number of translation tables. The word is sent to the EPL in a single wireless message. The word is received by the EPL. The word is decoded by the EPL using the translation tables. Finally, the second information is displayed by the EPL.

It is accordingly an object of the present invention to provide a method of sending messages to an EPL.

It is another object of the present invention to provide a method of sending messages to an EPL using binary hexadecimal data.

It is another object of the present invention to provide a method of sending messages to an EPL which conserves system bandwidth.

It is another object of the present invention to provide a method of sending messages to an EPL which is more reliable than sending a plurality of messages.

It is another object of the present invention to provide a method of sending messages to an EPL which is faster than sending segment information.

BRIEF DESCRIPTION OF THE DRAWINGS

Additional benefits and advantages of the present invention will become apparent to those skilled in the art to which this invention relates from the subsequent description of the preferred embodiments and the appended claims, taken in conjunction with the accompanying drawings, in which:

DETAILED DESCRIPTION OF THE PREFERRED EMBODIMENTS

Figure 1:
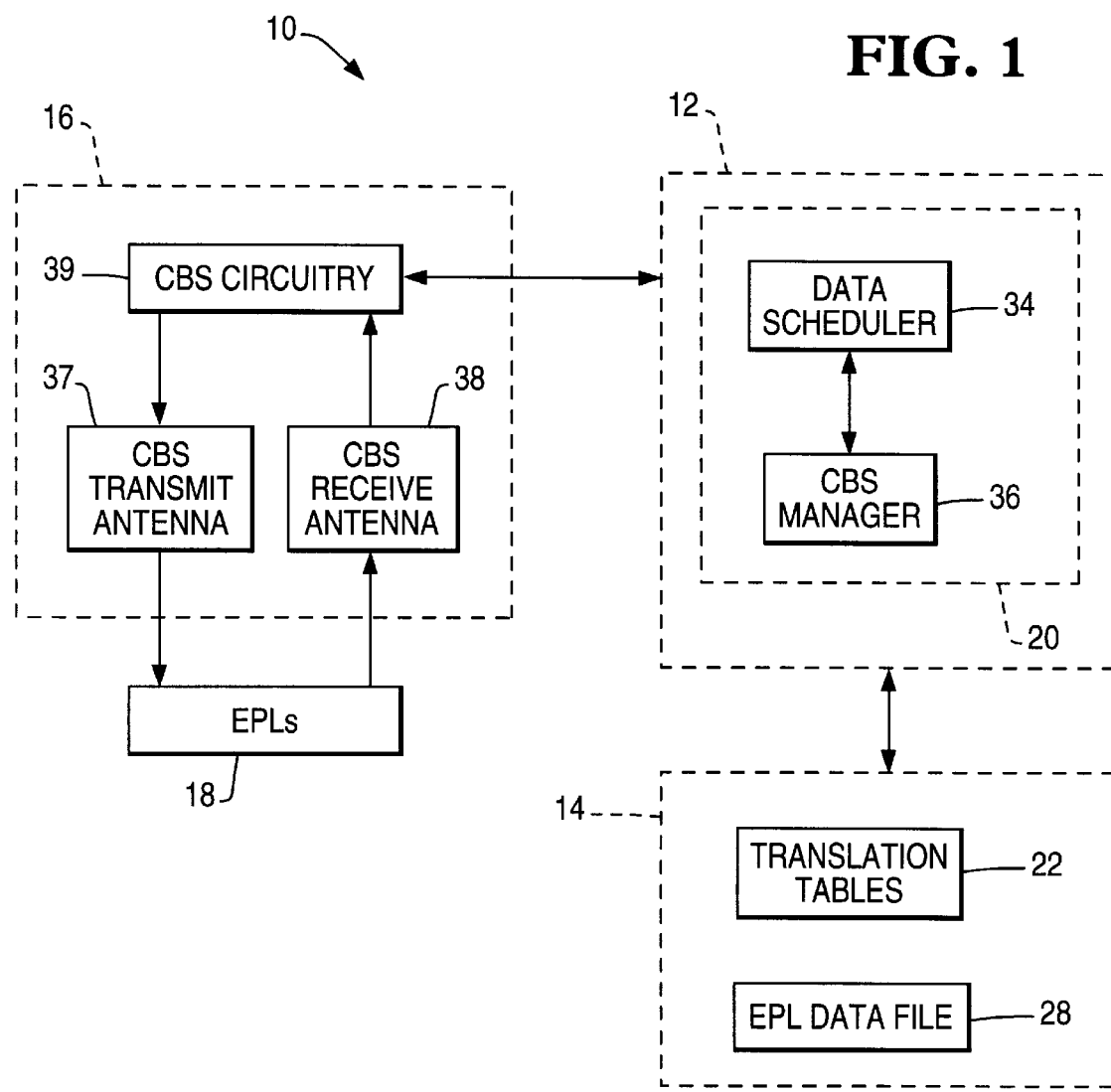
FIG. 1 is a block diagram of an EPL system.

Referring now to FIG. 1, EPL system 10 includes computer 12, storage medium 14, communication base station (CBS) 16, and electronic price labels (EPLs) 18.

EPL computer 12 executes EPL control software 20. EPL control software 20 records, schedules, and transmits all messages to EPLs 18 through CBS 16, and receives and analyzes messages from EPLs 18 through CBS 16.

EPL control software 20 primarily includes data scheduler 34 and CBS manager 36. Data scheduler 34 schedules EPL price change messages to be sent to EPLs 18 through CBS 16. Data scheduler 34 schedules polling and EPL computer acknowledgment messages to be sent to EPLs 18 through CBS 16.

CBS manager 36 controls transmission of price change messages and polling messages to EPLs 18. CBS manager 36 controls reception of status and acknowledgment messages from EPLs 18.

EPL control software 20 maintains and uses translation tables 22 and EPL data file 28.

EPL control software 20 uses translation tables 22 to convert message information to binary hexadecimal data which is sent to an EPL using a single message.

EPL data file 28 contains item information, EPL identification information, and status information for each of EPLs 18.

Storage medium 14 is preferably a fixed disk drive. Storage medium 14 stores translation tables 22 and EPL data file 28.

CBS 16 preferably includes one transmit antenna 37 and up to four receive antennas 38 for transmitting and receiving messages between CBS 16 and EPLs 18. CBS 16 includes CBS circuitry 39 which controls operation of CBS 16. EPL system 10 preferably includes a plurality of CBSs 16 connected together in series.

Figure 2:
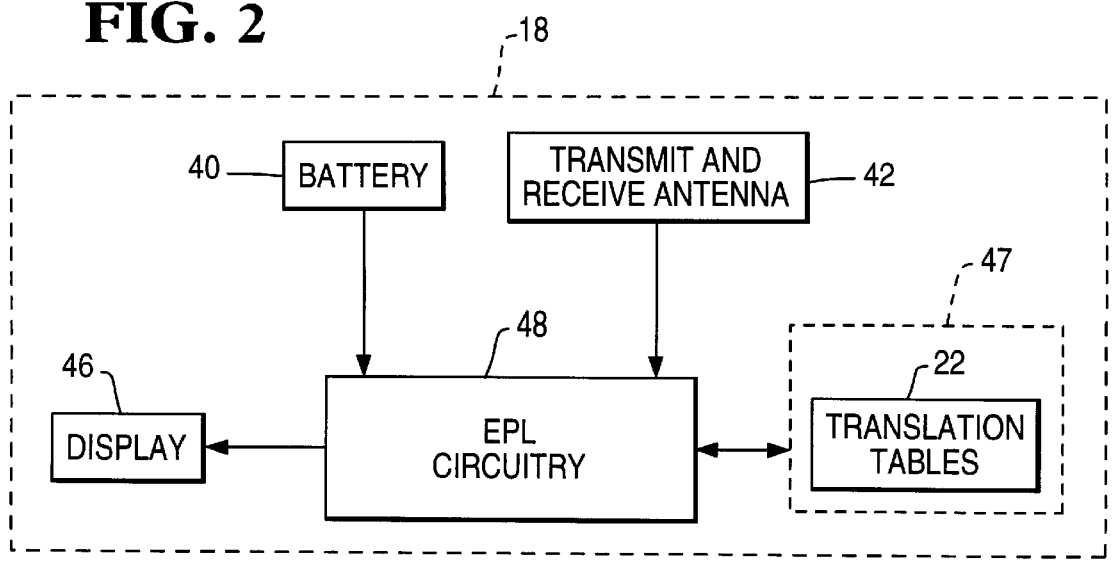
FIG. 2 is a block diagram of an EPL.

Turning now to FIG. 2, EPLs 18 each include battery 40, transmit and receive antenna 42, display 46, memory 47, and EPL circuitry 48.

Battery 40 provides power to EPLs 18.

Transmit and receive antenna 42 receives price change and status messages from CBS 16. Transmit and receive antenna 42 transmits responses in the form of acknowledgments to price change and status messages to CBS 16.

Display 46 displays price and possibly additional information. Display 46 is preferably a liquid crystal display (LCD).

Memory 47 stores price verifier information, EPL type information, and may additionally store promotional information. Memory 47 also stores binary hexadecimal data sent from EPL computer 12 and translation tables 22 that enable EPL circuitry 48 to interpret words from host computer 12. EPL 18 obtains translation tables 22 during manufacture. EPL software 20 must have access to identical translation tables 22 to correctly key EPL 18.

EPL circuitry 48 controls the internal operation of EPLs 18. EPL circuitry 48 receives messages from EPL computer 12 and transmits response messages to EPL computer 12. EPL circuitry 48 controls display of price and other information, including blinking.

Under the method of the present invention, EPL circuitry 48 also receives binary hexadecimal data from EPL computer and uses it to control display 46.

Figure 3:
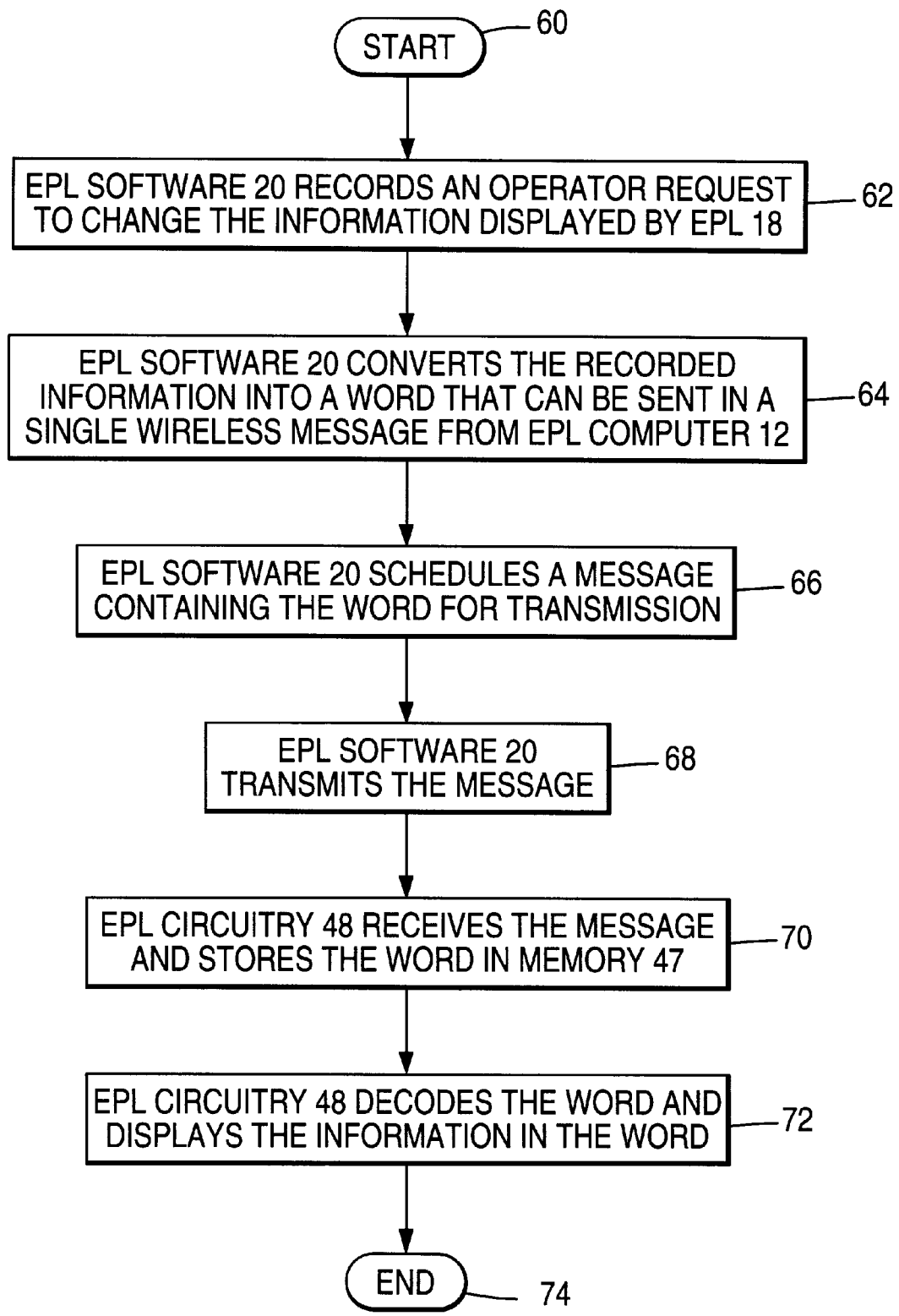
FIG. 3 is a flow diagram illustrating the method of the present invention.

Turning now to FIG. 3, the operation of system 10 in accordance with the method of the present invention is illustrated in more detail, beginning with START 60.

In step 62, EPL software 20 records an operator request to change the information displayed by EPL 18.

In step 64, EPL software 20 converts the recorded information into a word that can be sent in a single wireless message from EPL computer 12. The message may be a price change message containing a new price to be displayed, a message containing promotional information to be displayed, or other type of message.

The conversion process is accomplished using the information in translation tables 22 below:

Translation Table I

| Binary Code | Displayed Value |
| --- | --- |
| 0 | 0 |
| 1 | 1 |
| 2 | 2 |
| 3 | 3 |
| 4 | 4 |
| 5 | 5 |
| 6 | 6 |
| 7 | 7 |
| 8 | 8 |
| 9 | 9 |
| A | Blank (Space) |
| B | E (Error) |
| C | ¢ (Cents) |
| D | $ (Dollars) |
| E | — (dash) |
| F | |

Translation Table II

| Binary Code | Displayed Value |
| --- | --- |
| 0 | |
| 1 | A |
| 2 | B |
| 3 | C |
| 4 | D |
| 5 | E |
| 6 | F |
| 7 | G |
| 8 | H |
| 9 | I |
| A | J |
| B | K |
| C | L |
| D | M |
| E | N |
| F | O |

Translation Table III

| Binary Code | Displayed Value |
| --- | --- |
| 0 | P |
| 1 | Q |
| 2 | R |
| 3 | S |
| 4 | T |
| 5 | U |
| 6 | V |
| 7 | W |
| 8 | X |
| 9 | Y |
| A | Z |
| B | |
| C | |
| D | |
| E | |
| F | |

Preferably, three translation tables 22 are employed to build a binary hexadecimal word containing any of numerals 0–9, letters A–Z, blanks, and predetermined additional symbols.

Each word preferably includes one or more table identifier portions that identify which tables 22 are needed to create and decode the word, and one or more content portions which contain the information to be displayed.

It is a feature of the present invention that words which are formed using table identifiers and special characters from Tables II and III, and which are less than or equal to maxiumum system word length can be sent in a single message from host computer 12 to EPL 18.

The following examples are based on an 8-character LCD, but the method of the present invention may be extended to larger displays, consistent with system bandwidth availability.

The following examples are also based on a display which has two price fields of four display characters each, total price and unit price, and which, therefore, require at least a 10-character maximum system word length to handle the addition of two table identifiers. Other types of displays are also envisioned, consistent with maximum system word length.

For example, a message instructing an EPL to display "SAVE 30¢" would contain the binary word "B31650A30C". Looking at the first half of the word, the character "B" is a table identifier which indicates that table III is in use for the first displayed character, table II is in use for the second displayed character, table III is in use for the third displayed character, and table II is in use for the fourth displayed character. Thus, character "3" represents displayed character "S", character "1" represents displayed character "A", character "6" represents displayed character "V", and character "5" represents displayed character "E".

Looking at the second half of the word, the character "0" is a table identifier which indicates that table I is in use for the fifth, six, seventh, and eighth displayed characters. Thus, character "A" represents a blank, character "3" represents displayed character "3", character "0" represents displayed character "0", and character "C" represents displayed character "¢".

Placeholders may be added to match word length to a maximum system word length. For example, in systems that have a maximum word length of twelve characters, the message above may be modified to "B0316500A30C", in which the second and eighth characters are placeholders. EPL circuitry 48 within an 8-character display ignores these placeholders in decoding the word.

For consistency, display information that comes solely from Table I may be also encoded into the same 10-character format, rather than being sent as eight characters of raw data. For example, a message instructing EPL 18 to display a total price for an item of four dollars and a unit price of forty cents would require only characters from Table I. Thus, the 10-character binary word would be "0A4000A40C".

Looking at the first half of the word, the character "0" is a table identifier which indicates that table I is in use for the first, second, third, and fourth characters. Character "A" represents a blank or non-displayed character, character "4" represents displayed character "4", character "0" represents displayed character "0", and character "0" represents displayed character "0".

Looking at the second half of the word, the character "0" is a table identifier which indicates that table I is in use for the fifth, six, seventh, and eighth displayed characters. Thus, character "A" represents a blank, character "4" represents displayed character "4", character "0" represents displayed character "0", and character "C" represents displayed character "¢".

In step 66, EPL software 20 schedules a message containing the word for transmission.

In step 68, EPL software 20 transmits the message.

In step 70, EPL circuitry 48 receives the message and stores the word in memory 47.

In step 72, EPL circuitry 48 decodes the message and displays the new information in accordance with the instructions contained in the word.

Operation ends in step 74.

The method of the present invention provides limited ASCII subset support without paying the entire communication overhead cost of a full ASCII implementation. The method increases communication speed by reducing message size and number of messages from two to one.

Additionally, since the present invention uses only one message, it makes the price change process more reliable.

Although the present invention has been described with particular reference to certain preferred embodiments thereof, variations and modifications of the present invention can be effected within the spirit and scope of the following claims.

What is claimed is:

1. A method of wirelessly sending information to an electronic price label (EPL) for display on a multiple segment display comprising the steps of:

recording second information in response to an operator request to change first information displayed by the EPL, wherein the second information includes predetermined characters within a group of characters including numerals 0–9, letters A–Z, blanks, and predetermined symbols;

encoding the second information into a word using a number of translation tables;

sending the word to the EPL in a single wireless message;

receiving the word by the EPL;

decoding the word by the EPL using a corresponding set of translation tables stored in the EPL; and displaying the second information by the EPL on the multiple segment display.

2. A method of wirelessly sending information to an electronic price label (EPL) for display comprising the steps of:

recording second information in response to an operator request to change first information displayed by the EPL, wherein the second information includes predetermined characters within a group of characters including numerals 0–9, letters A–Z, blanks, and predetermined symbols;

encoding the second information into hexadecimal data using a plurality of translation tables, wherein the hexadecimal data has a first portion identifying the translation tables and a second portion containing the second information;

receiving the hexadecimal data by the EPL;

decoding the hexadecimal data by the EPL using the first portion of the hexadecimal data and a corresponding set of translation tables stored in the EPL, to decode the second portion containing the second information; and displaying the second information by the EPL.

3. A method of changing first and second information displayed by an electronic price label (EPL) comprising the steps of:

recording new first and second information, in response to an operator request to change first and second information displayed by the EPL, wherein the new first and second information includes predetermined characters within a group of characters including numerals 0–9, letters A–Z, blanks, and predetermined symbols;

encoding the new first and second information into hexadecimal data using a plurality of translation tables, wherein the hexadecimal data has a first portion identifying first predetermined ones of the translation tables, a second portion containing the new first information encoded using the first predetermined ones of the translation tables, a third portion identifying second predetermined ones of the translation tables, and a fourth portion containing the new second information encoded using the second predetermined ones of the translation tables;

sending the hexadecimal data to the EPL in a single wireless message;

receiving the hexadecimal data by the EPL;

reading the first and third portions of the hexadecimal data to identify the first and second predetermined ones of the translation tables;

decoding the second portion of the hexadecimal data using the first predetermined ones of corresponding translation tables stored by the EPL;

decoding the fourth portion of the hexadecimal data using the second predetermined ones of corresponding translation tables stored by the EPL; and displaying the new first and second information by the EPL.

4. A method of displaying information by electronic price label (EPL) comprising the steps of:

identifying a maximum number of characters that the EPL can display;

identifying a maximum number of characters that the EPL can receive in a single message;

recording a number of second characters equal to the maximum number of characters that the EPL can display in response to an operator request to change first characters displayed by the EPL, wherein the second characters include predetermined characters within a group of characters including numerals 0–9, letters A–Z, blanks, and predetermined symbols;

generating a word having a length no greater than maximum number of characters that the EPL can receive in a single message including the substeps of encoding the second characters into an equal number of third characters using a number of translation tables; and providing a fourth character which identifies the translation tables;

sending the word to the EPL in a single wireless message;

receiving the word by the EPL;

reading the fourth character to identify corresponding translation tables stored by the EPL;

decoding the third characters to identify the second characters by the EPL using the corresponding translation tables; and displaying the second characters by the EPL.

5. A method of displaying information by electronic price label (EPL) comprising the steps of:

identifying a maximum number of characters that the EPL can display;

identifying first and second groups of characters within the maximum number of characters that the EPL can display;

identifying a maximum number of characters that the EPL can receive in a single message;

recording second characters in response to an operator request to change first characters in the first group of characters displayed by the EPL;

recording fourth characters in response to an operator request to change third characters in the second group of characters displayed by the EPL;

wherein the second and fourth characters include predetermined characters within a list of characters including numerals 0–9, letters A–Z, blanks, and predetermined symbols;

generating a word having a length no greater than maximum number of characters that the EPL can receive in a single message including the substeps of encoding the second characters into an equal number of fifth characters using a first number of translation tables;

providing a sixth character which identifies the first number of translation tables;

encoding the fourth characters into an equal number of seventh characters using a second number of translation tables; and providing an eighth character which identifies the second number of translation tables;

sending the word to the EPL in a single wireless message;

receiving the word by the EPL;

reading the sixth character to identify the first number of corresponding translation tables stored by the EPL;

decoding the fifth characters to identify the second characters by the EPL using the translation tables corresponding to the first number;

reading the eighth character to identify the second number of the corresponding translation tables stored by the EPL;

decoding the seventh characters to identify the fourth characters by the EPL using the translation tables corresponding to the second number; and displaying the second and fourth characters by the EPL on a multiple segment display.

6. An electronic price label (EPL) system comprising an EPL computer, a storage medium, a communication base station (CBS) and a plurality of electronic price labels (EPLs) which wirelessly communicate with the CBS, the improvement comprising:

EPL control software executed by the EPL computer which employs translation tables to convert message information to be wirelessly sent to an EPL to binary data which is sent using a single wireless message;

EPL memory in the EPL storing corresponding translation tables; and

EPL control circuitry in the EPL for utilizing the corresponding translation tables to display price or other information on a display in response to the single wireless message.

7. The EPL system of claim 6 wherein the single wireless message is a binary word having a first half and a second half, the first half including a first table identifier and the second half including a second table identifier.

8. The EPL system of claim 7 wherein the first half of the binary word further comprises a sequence of characters and the first table identifier indicates a table sequence to be followed in looking up the sequence of characters.

9. An electronic price label (EPL) adapted for wireless communication in an EPL system, the EPL comprising a battery, a transmit and receive antenna, a display, memory and EPL control circuitry, the improvement comprising:

EPL memory storing a plurality of translation tables to convert message information sent in a single wireless message to display information; and EPL control circuitry for utilizing the translation table to display price and other information on the display in response to the single wireless message.

10. The EPL of claim 9 wherein the display is a multiple segment liquid crystal display.

11. The EPL of claim 9 wherein the plurality of translation tables correlate binary code and displayed values and a particular binary code in a first translation table has a different displayed value than the particular binary code has in a second translation table.

12. The EPL of claim 11 wherein these translation tables are employed with a hexadecimal binary code for displayed values including numerals 0–9 and alphabet characters A–Z.

13. The EPL of claim 9 wherein a single memory stores price verifier information, EPL type information, store promotional information, received binary hexadecimal data, and said plurality of translation tables.

14. The EPL of claim 13 wherein said plurality of translation tables are stored during manufacture of the EPL.

* * * * *